United States Patent [19]
Gardner et al.

[11] Patent Number: 6,064,978
[45] Date of Patent: May 16, 2000

[54] QUESTION AND ANSWER SYSTEM USING COMPUTER NETWORKS

[75] Inventors: Daniel K. Gardner, San Luis Obispo; Clinton A Staley, Atascadero; Matthew A. Wormley, San Luis Obispo, all of Calif.

[73] Assignee: Experts Exchange, Inc., San Luis Obispo, Calif.

[21] Appl. No.: 08/881,600

[22] Filed: Jun. 24, 1997

[51] Int. Cl.[7] .................................................... G06F 19/00
[52] U.S. Cl. ................. 705/10; 706/45; 434/322
[58] Field of Search ............................... 705/10; 706/45; 434/322

[56] References Cited

U.S. PATENT DOCUMENTS

| | | | |
|---|---|---|---|
| 5,180,309 | 1/1993 | Egnor | 434/323 |
| 5,441,415 | 8/1995 | Lee et al. | 434/350 |
| 5,455,903 | 10/1995 | Jolissaint et al. | 395/155 |
| 5,725,384 | 3/1998 | Ito et al. | 434/350 |
| 5,740,035 | 4/1998 | Cohen et al. | 705/10 |
| 5,743,746 | 4/1998 | Ho et al. | 434/332 |
| 5,784,539 | 7/1998 | Lenz | 706/45 |

OTHER PUBLICATIONS

WWW site, www.inquiry.com, 1997.
WWW site, www.findout.com, 1997.
WWW site, www.answers.com, 1997.

*Primary Examiner*—Allen R. MacDonald
*Assistant Examiner*—Penny Caudle
*Attorney, Agent, or Firm*—Fitch, Even, Tabin & Flannery

[57] ABSTRACT

A method for regulating the asking and motivating the answering of questions via a computer network. The number and complexity of questions asked is controlled by a question regulation method, and the number and quality of answers provided is controlled by an answer evaluation method. The question regulation method permits users to post more numerous or more complex questions based on factors such as viewing of advertising, or provision of marketing information. The answer measurement method may be used to reward those who supply numerous or high-quality answers with premiums, public recognition, or employment opportunities.

35 Claims, 7 Drawing Sheets

```
┌─────────────────────────────────────────────────────────────────┐
│ ☐        Netscape - [Experts Exchange: Unix Networks TopicArea] ▼▲│
│  File   Edit   View   Go   Bookmarks   Options   Directory   Windows   Help │
│  [Back][Forward][Home]  [Reload][Search][Open][Print][Find]  [Stop]         │
│  Go to: http://www.experts-exchange.com/browsing/comp/unix/network/         │
│  [What's New][What's Cool][Handbook][Net Search][Net Directory]             │
└─────────────────────────────────────────────────────────────────┘
```

Unix Networks Questions Awaiting Answers:

| | date | pts /202 | title \200 | 208\ user |
|---|---|---|---|---|
| D | 6/22/97 | 100 | Sunnet Manager Problem (pls help ! !) | sbruce,2 |
| D | 6/20/97 | 100 | Moving Website from UNIX/Informix to NT / SQL | leitner |
| D | 6/8/97 | 50 | Solaris 2.5.1x 86 - Printer doesn't work | webbjo |
| D | 6/2/97 | 100 | Sparc and Cisco 2500 access servers | chrisvo |
| D | 6/1/97 | 100 | Mechanism of TCP / IP Socket Buffer... | jrchen |

Unix Networks Questions Awaiting Answer Evaluation (locked)

| | date | pts | title \204 | user |
|---|---|---|---|---|
| G D | 6/19/97 | 100 | can't open queue file | ymlew |
| G D | 6/16/97 | 100 | Sun: enabling rlogin under SUNWnak - question | wbutry |
| G D | 6/10/97 | 50 | Setting up a router | domino |
| G D | 6/4/97 | 50 | in.routed: packet from unknown router | qtip |
| D | 6/1/97 | 210 | | |
| G D | 5/21/97 | 100 | Problem Routing Network through ISDN on... | hoffman |
| G D | 5/15/97 | 50 | topview for Solaris2.5.x | ohno |

Previously Asked Questions available for 10% 0f their original value!   \_206

| | date | pts | title | user |
|---|---|---|---|---|
| D | 6/17/97 | 10 | gethostbyname | andzei |
| D | 5/30/97 | 10 | Connecting a '95 Client On A Xenix IV... | Fox Mulder |
| D | 5/29/97 | 10 | Automatic e-mail Reply | Slarti |
| D | 5/25/97 | 5 | Solaris 2.4 Routing | maurano |
| D | 5/25/97 | 10 | Solaris 2.4 Routing | maurano |
| D | 5/15/97 | 5 | TCP/IP network analyzer ? | ronbarak |
| D | 5/6/97 | 10 | socket & process-id | rv33100 |
| D | 5/5/97 | 0 | New topic area ? | candy |
| D | 5/2/97 | 10 | PPP/Solaris 2.5.1 | grep |
| D | 5/1/97 | 10 | hme interface | hongbin |
| D | 5/1/97 | 10 | Sendmail overriding Eudora return address | teklord |

[Enter a New Questions!]
[Back] [Home] [How to use Experts Exchange]

Document : Done

FIG. 2

```
┌─────────────────────────────────────────────────────────────────────────┐
│ ☐ Netscape - [Experts Exchange(sm): Previously Asked C++ Language Question] ▼▲│
│   File  Edit  View  Go  Bookmarks  Options  Directory  Windows  Help    │
│   [Back][Forward][Home][Reload][Search][Open][Print][Find][Stop]        │
│   Go to: http://www.experts-exchange.com/topics/bin/showQ?qid=8630005784&buyit=y │
│   [What's New][What's Cool][Handbook][Net Search][Net Directory][Software] │
└─────────────────────────────────────────────────────────────────────────┘
```

Previously Asked C++ Language Question: How to Use DLL

| | |
|---|---|
| Titles: "How to Use DLL" | |
| Value: 5 Points | |
| Question: | |
| Could any one help me please? I'm using Visual C++4.0 to create a project (a.dll file). I try to use a testapi.dll file created by Borland C++5.0. I insert the testapi.lib into the project file list. When I built the project, there is an error. | |
| Answer from chensu... | |
| Is testapi.dll 32-bit or 16-bit? If it is 16-bit, you have to use thunk to use it with 32-bit applications. If it is 32-bit, create a new import library. 32-bit VC++does not have "implib. exe". See KB article PSS ID Number. Q 131313. | |
| Answer from md... | |
| Thunks allow code on one side of the 16-32 process boundary to call into code on the other side of the boundary. Windows 95 supports a thunk compiler, so a Win32-based application can load and call a 16-bit DLL. For more information, see the following documentation: SDKs/Win32 SDK/Programming Guides and Tools/Programmer's Guide to Windows 95/Using Windows 95 Features/Thunk Compiler. | |

Question history: ⟋302                                    300⟍

| | |
|---|---|
| Comment from md... | Create a new import library by running implib.exe. The lib files of BC++are not compatible with VC++. |
| Comment from Gina... | Do you mean run the "implib.exe" command in "/msdev/bin"? I couldn't find "implib.exe: in "msdev/bin". I tried "link testapi/implib: testapi.dll" in "msdev/bin", still got the same error. "testapi.dll: fatal error LNK1136, invalid or corrupt file". Could you tell me how to create a new import library in VC++? |
| Accepted Answer from Chensu... ⟍304 | Is testapi.dll 32-bit or 16-bit? If it is 16-bit, you have to use thunk to use it with 32-bit applications. If it is 32 bit, create a new import library. 32-bit VC++does not have "implib.exe". See KB article PSS ID Number. Q131313. |
| Comment from Gina | Thanks Chensu for help. I tried a 32-bit dll, it can work. But what did you mean: "If it is 16-bit, you have to use thunk to use it with 32-bit applications"? |
| Accepted Answer from md... ⟍306 | Thunks allow code on one side of the 16-32 process boundary to call into code on the other side of the boundary. Windows 95 supports a thunk compiler, so a Win32-based application can load and call a 16-bit DLL. For more information, see the following documentation: SDKs/Win32 SDK/Programming Guides and Tools/Programmer's Guide to Windows 95/Using Windows 95 Features/Thunk Compiler. |
| Document : Done | |

FIG. 3

QUESTION AND ANSWER SYSTEM USING COMPUTER NETWORKS

BACKGROUND OF THE INVENTION

1. Field of the Invention

The present invention is related to the field of regulating and motivating the provision of answers to questions, utilizing a computer system or network.

2. Description of Related Art

Business networks and the Internet are often used as a means of publishing questions and receiving answers to those questions from other people using the network. The Usenet newsgroup system, for instance, allows users to publish questions or comments on a wide variety of topics, and allows other users to answer, with both questions and answers widely distributed over the Internet. The Usenet system operates on a volunteer basis, with no special incentive for answering questions. As Internet traffic has grown, the volume of questions on the Usenet systems has become too large to handle on a purely volunteer basis, especially in the most popular topic areas. The Usenet newsgroups do not have any automatic means of regulating the number of questions a given user asks, and they include no means of rewarding those who answer questions. Also, publishing a question or answer in a newsgroup exposes the publisher to unwanted Email and loss of confidentiality, since published questions and answers include an Email address.

Several World Wide Web sites have recently been created to provide answers to questions by allowing Web users to publish questions and obtain answers. Examples of such sites include: www.answers.com, www.findout.com, and www.inquiry.com. Some sites charge for the service (www.answers.com); others offer simple answers for free as a way of attracting customers their Web site (www.findout.com, www.inquiry.com). These sites either charge money for answers, or place no limit on the number of questions a user can ask. None of these sites allow general Web users to answer questions.

What is needed is a method for providing questions and answers over a computer network, with a flexible means of regulating the number of questions each user asks, and a non-monetary incentive for inducing other users to answer questions.

BRIEF SUMMARY OF THE INVENTION

A method for regulating the asking and motivating the answering of questions over a computer network is described. The method includes a question regulation system, which limits the number and complexity of questions asked. In the preferred embodiment, each asker of questions is given a number of question points. The asker then publishes a question via the computer network, assigning to the question part or all of his bank of question points based on the question's complexity and urgency. The method also includes an answer evaluation system. In the preferred embodiment, an answerer provides an answer to a published question, via the computer network. The asker then either accepts or rejects the answer. If he rejects the answer, the question remains available over the network for other answerers to attempt to answer. If the asker accepts the answer, he also provides a quantitative evaluation of the quality of the question, assigning it a numerical or letter grade for instance. The answer evaluation system combines the quantitative evaluation with the number of question points assigned by the asker to the question, to compute an award of answer points, which award is given to the answerer.

The question regulation system provides question points to each asker on a limited basis, in order to regulate the number and difficulty of questions each asker publishes. Question points may be provided in a fixed quantity per length of time, e.g. so many points per day, or may be sold. Question points may also be offered in exchange for viewing advertisements or for providing information of interest to an advertiser, e.g. an Email address or product evaluation. Answerers are rewarded for obtaining answer points in several ways. A published listing of answerers is placed on the computer network, with answerers ranked by the number of answer points they have earned. Premiums, e.g. T-shirts or coffee mugs, are provided to answerers who have accumulated a given number of answer points. If the computer network is within an organization, e.g. a corporate intranet, answers may be rewarded by organizational or corporate recognition for their contribution.

Answerers who have accumulated sufficient answer points to prove expertise may also be offered the opportunity to answer questions for payment, using a pay-for-answers system such as that of www.answers.com.

BRIEF DESCRIPTION OF THE DRAWINGS

FIG. 2 shows a World Wide Web page from the preferred embodiment providing a listing of questions and corresponding points.

FIG. 3 shows a World Wide Web page from the preferred embodiment providing a display of one question and its corresponding comments and accepted answers.

DETAILED DESCRIPTION OF INVENTION

Described is a method for regulating and motivating the asking and answering of questions over a computer network. In the following description, numerous specific details are set forth to provide a thorough understanding of the present invention. It will be apparent, however, to one of ordinary skill in the art that the present invention may be practiced without these specific details. In other instances, well-known algorithms, practices, and techniques have not been shown to avoid unnecessarily obscuring the present invention.

According to the present invention, two separate systems are used to regulate the asking and motivate the answering of questions via the computer network. A question regulation method controls the number and complexity of questions posed by the question askers, those publishing questions over the computer network. In the preferred embodiment, each asker is given a bank of question points in order to regulate the number of questions he may publish in a given period. An answer evaluation method is used to measure the quantity and quality of answers provided by question answerers, those providing answers to published questions via the computer network. In the preferred embodiment, each answerer accumulates a bank of answer points, based on the number of questions answered and a quantitative evaluation of each answer provided by the question asker. The answer evaluation system serves as an incentive to answer published questions. Answerers are rewarded according to the quality and quantity of their answers as measured by the answer evaluation system.

Question and Answer Method

Figure 1:
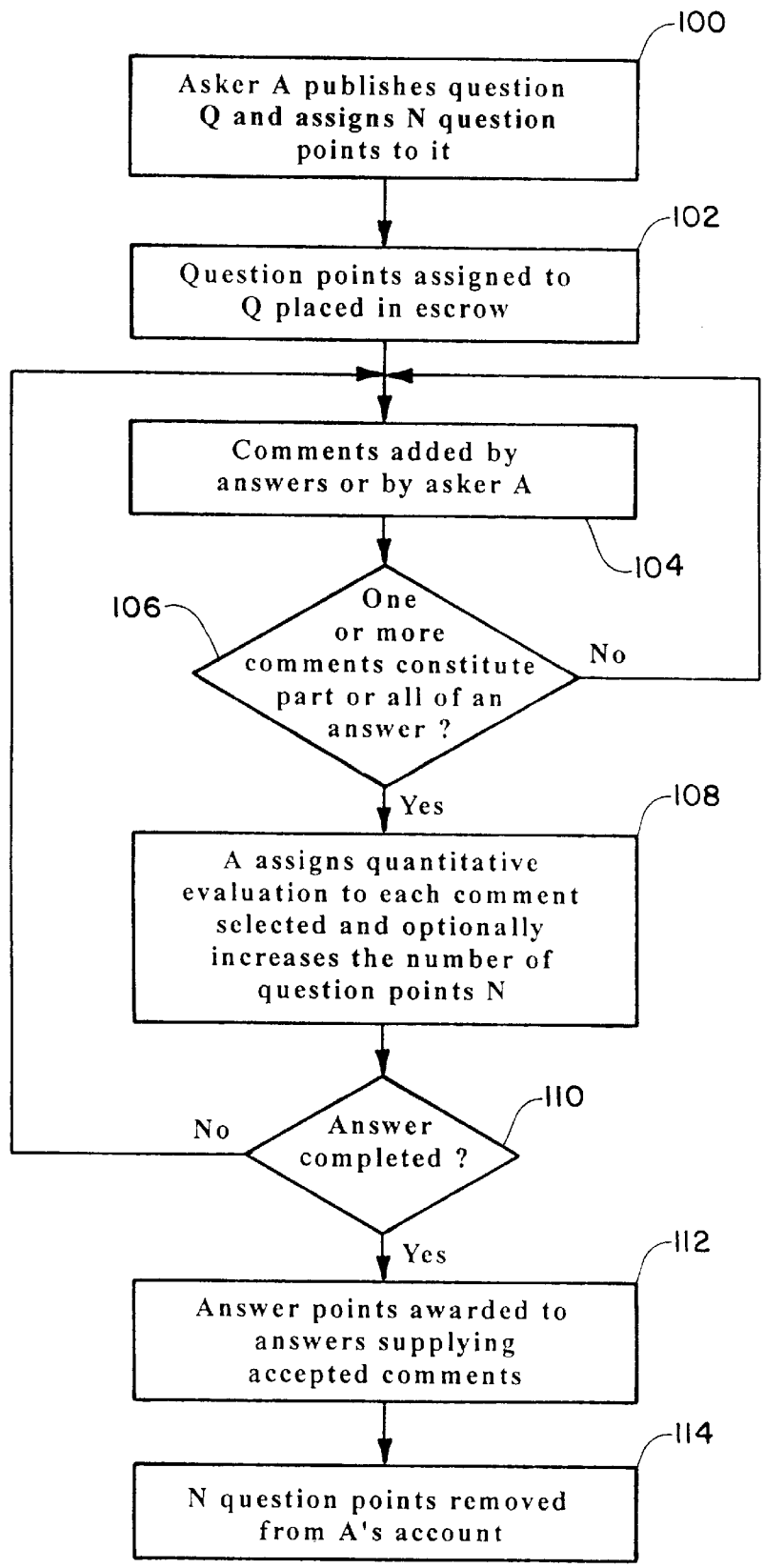
FIG. 1 is a flow chart depicting the process by which questions are published and answered.

The preferred embodiment of the question regulation and answer evaluation methods is described with reference to FIG. 1.

At step 100, a question asker A publishes a question Q and assigns a number N of question points to it. The asker may not assign more points than he has in his bank of question points. The asker will generally assign a number of question points proportional to the difficulty and urgency of the question, since a higher number of question points provides more incentive for answerers to reply, as detailed below in the description of step 112.

At step 102, N question points from A's bank of question points are placed in escrow, to prevent A from publishing more questions using those N points. Points are not actually deducted from A's bank until the published question is satisfactorily answered.

At step 104, comments relevant to the question Q are published by potential answerers and by A. This provides an opportunity for answerers to e.g. request and obtain clarifications to the question before providing an answer. It also permits several answerers to collaborate in providing an answer to question Q by providing one or more comments apiece which combine to form an answer.

At step 106, A determines whether one or more of the comments added at step 104 are sufficient to constitute an answer or part of an answer. If any comment or set of comments is sufficient to supply an answer or part of an answer, the process proceeds to step 108. Otherwise, the process returns to step 104 to await more comments.

At step 108, A assigns a quantitative evaluation, e.g. a letter grade or numerical score, to each of the comments that were deemed to constitute an answer or part of an answer in step 106. Comments already evaluated in prior iterations of step 108 may be reevaluated in this iteration of step 108 if A desires. Also, A may increase the number of points N assigned to the question, in order to attract more answerers.

At step 110, A determines if any more comments are needed to complete the answer. If the comments chosen in step 106 and evaluated in step 108 are sufficient to constitute a complete answer, the process proceeds to step 112. Otherwise the process returns to step 104 to await more comments.

At step 112, the average quantitative evaluation assigned to each comment in step 108 is combined with the number N of question points, e.g. by multiplication, to compute a number of answer points to be awarded to the set of answerers B who provided the comments evaluated in step 108. These answer points are then apportioned among the members of B, e.g. by using the quantitative evaluations as a weighting factor.

At step 114, the N question points currently in escrow are permanently removed from A's bank of question points.

With reference to FIG. 2, the preferred embodiment provides a World Wide Web (WWW) page displaying questions posted by askers. A question list 200 is displayed, with corresponding question point values 202 (the value N chosen in step 100). Below question list 200 is an evaluation list 204 showing questions that have comments and await evaluations at steps 106 and 108. Below the evaluation list 204 is a previously-asked-question (PAQ) list 206, showing questions for which completed answers are available (for which the entire algorithm of FIG. 1 has been completed).

Each asker is identified by a login name 208, made up by the asker. Answerers are similarly identified by login names. Askers and answerers are not identified by their legal names or Email addresses. This provides anonymity for askers and answerers.

Each of the questions in lists 200, 204, and 206 is hyperlinked to a corresponding question display for that question. With reference to FIG. 3, a question display for a PAQ is described. In the question display, a summary 300 shows the initial question followed by the accepted answers. In the bottom half of the question display a question history 302 shows all comments made on the question in chronological order. Accepted answers 304 and 306 from two different answerers are also shown. The accepted answers 304 and 306 are comments that were selected in step 106.

Regulation of Question Asking

Question points may be used to limit the number and complexity of questions asked by each asker. In the preferred embodiment, each asker is given a number of points per day, which points accrue in the asker's bank of question points until they are used by the asker to publish a question.

Figure 4:
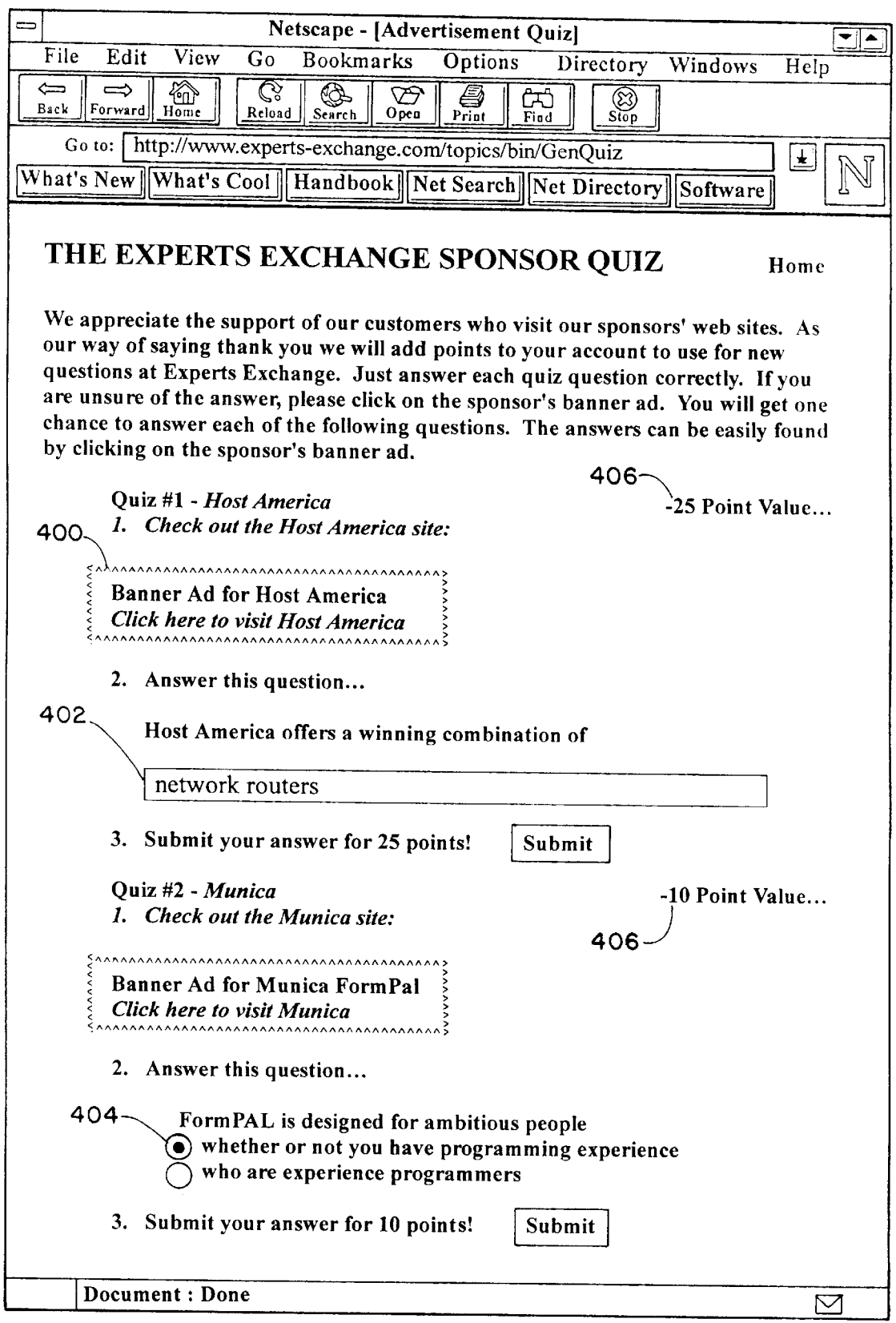
FIG. 4 shows a World Wide Web page from the preferred embodiment providing an advertising display using question points as an incentive.

With reference to FIG. 4, the preferred embodiment includes a WWW page by which an asker may view advertisements, and then answer questions about the advertisement, to demonstrate that he has viewed the advertisement. The preferred embodiment awards question points to an asker if he responds correctly to quiz questions.

A hyperlinked image 400 provides a link to an advertiser's WWW page. The asker may view the advertiser's page by mouse-clicking on the image.

Two quizzes 402 and 404 are presented to the asker, each asking questions that may be readily answered only by viewing the advertiser's page. The asker may respond to the short-reply quiz 402 by filing in a brief reply of several words. The asker may respond to the multiple-choice quiz 404 by choosing from a multiple-choice selection of answers. If the asker responds correctly to a quiz, the number of question points 406 indicated with the quiz is added to his bank of question points. The asker may make at most one attempt to respond correctly to each quiz. This motivates the asker to examine the advertiser's page, rather than guess at a response.

The preferred embodiment uses a regular expression (not shown) to determine the correctness of the response to a short-reply quiz. The response entered is deemed correct, and question points 406 are awarded to the asker, if and only if the asker's response matches the regular expression. Regular expressions are a way of describing patterns of symbols via mathematical expressions, and are well established in the art. A good reference on regular expressions is Hopcroft, *Introduction to Automata Theory, Languages and Computation*.

Figure 5:
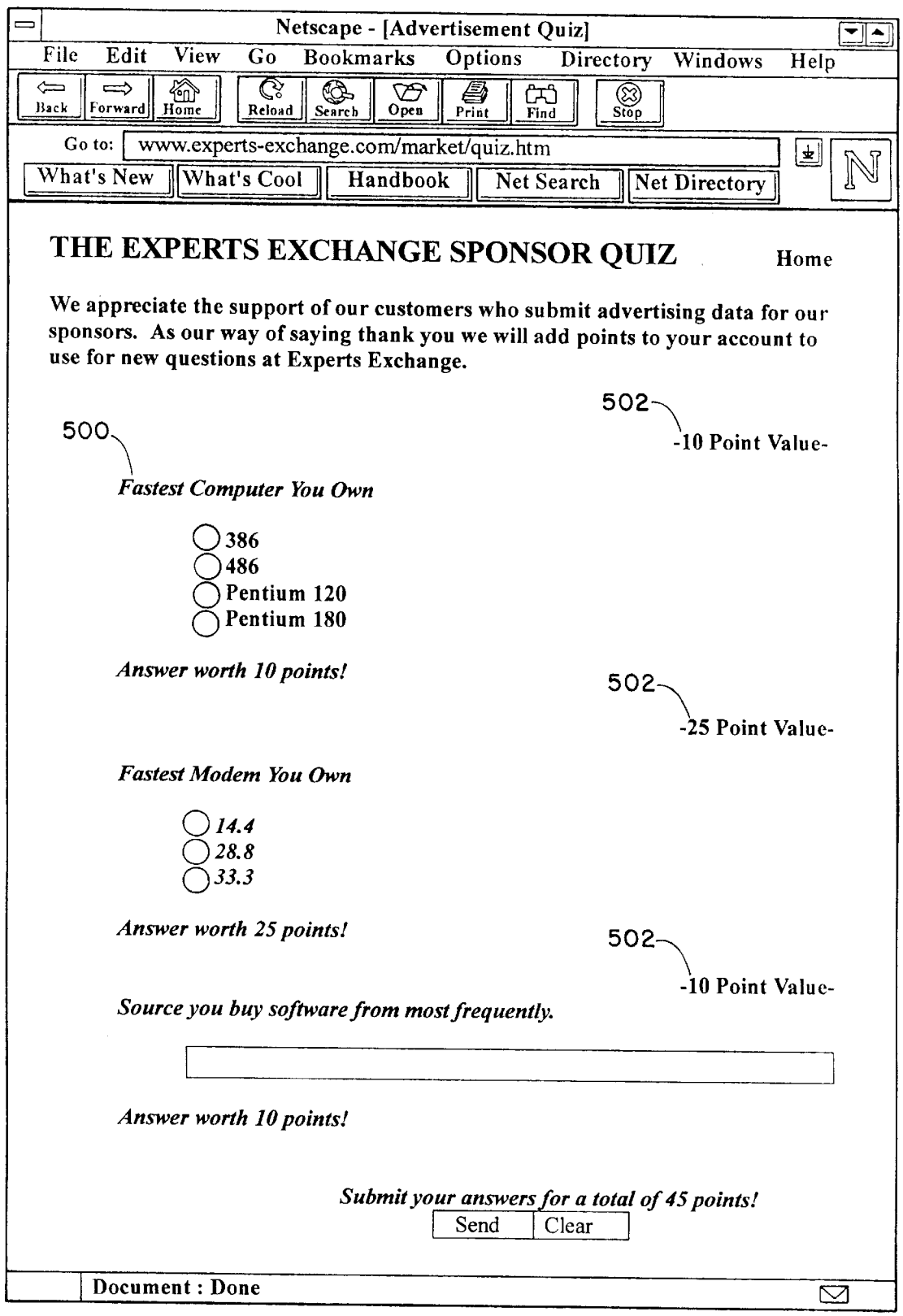
FIG. 5 is a diagram of a World Wide Web page from the preferred embodiment, providing a display using question points as an incentive to provide personal or marketing information.

An alternative to the process described for FIG. 4 is described with reference to FIG. 5. At 500, the asker may fill in marketing information, instead of responding to quizzes. The marketing information will be supplied to the advertiser. In exchange for providing this information, the asker is awarded the number of question points 502 indicated along with each piece of marketing information.

Motivating the Answering of Questions

Figure 6:
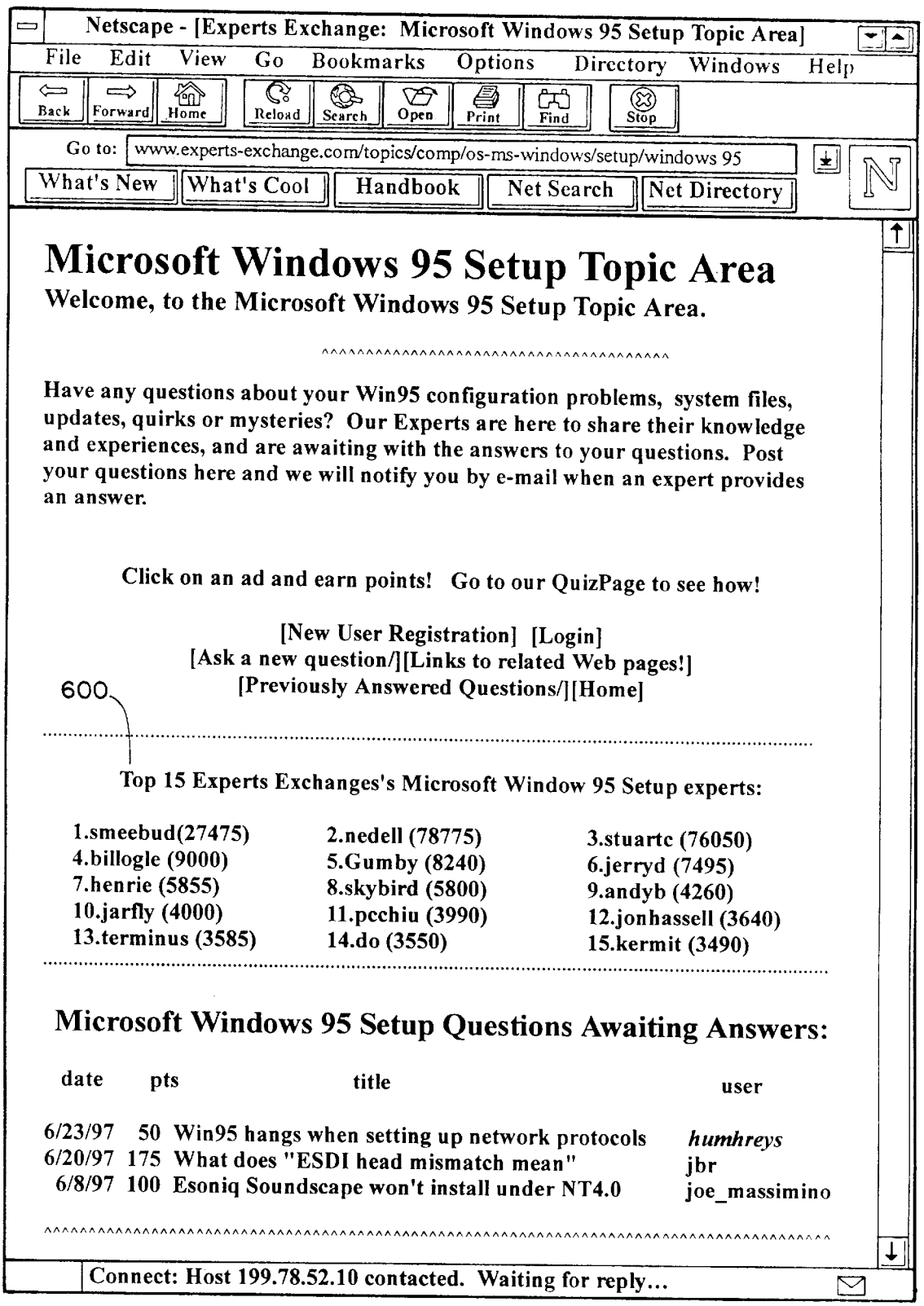
FIG. 6 shows a World Wide Web page from the preferred embodiment displaying a ranking of answerers.
Figure 7:
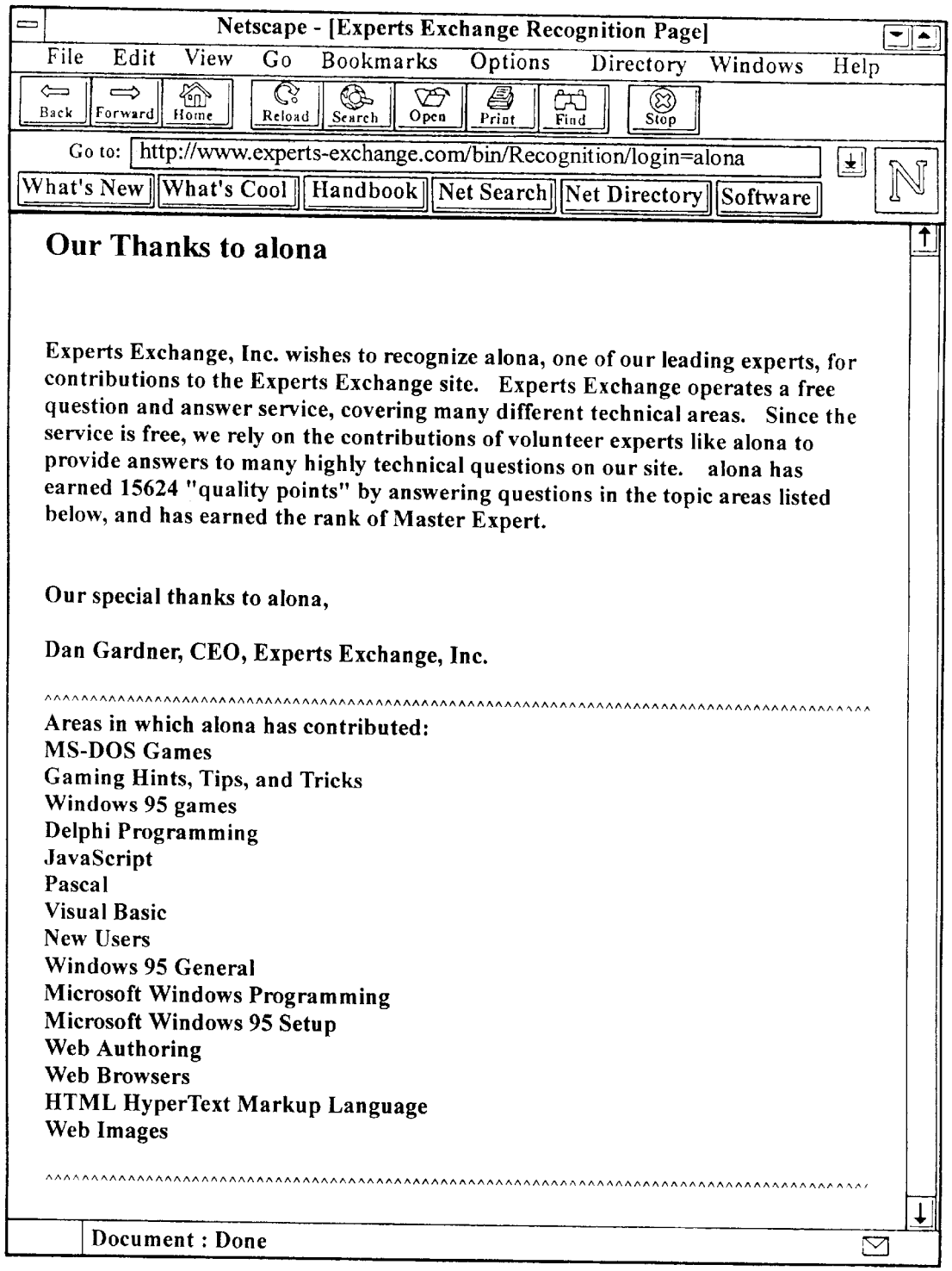
FIG. 7 is a diagram of a World Wide Web page from the preferred embodiment, providing public recognition to an answerer.

The preferred embodiment provides several incentives for answerers to earn answer points by answering questions and by earning high quantitative evaluations from the asker at step 108. First, with reference to FIG. 6, a public display 600 is provided with the best answerers ranked according to the number of answer points each has earned. Second, answerers earning a sufficient number of answer points are given free premiums such as tshirts. Third, answerers with sufficient answer points may be selected for participation as answerers in a separate WWW site where questions and answers are exchanged for payment, instead of nonnegotiable points. Fourth, answerers receive formal recognition of their contribution, e.g. a business letter expressing appreciation for their assistance, and a WWW page acknowledging them, an example of which is shown in FIG. 7.

The preferred embodiment specifically does not permit conversion of answer points into question points. In other words, the right to ask questions is not included among the incentives offered to answerers. Answerers may also be askers, but they receive question points in the same manner as any other asker. This rule is important because it prevents the method from becoming a legal bartering system, subject to income taxation in the United States.

A working commercial implementation providing an embodiment similar to the preferred embodiment described is publicly available via WWW at http://www.experts-exchange.com.

Conclusion, Ramifications, and Scope of Invention

The reader will see that the method described provides an effective means of regulating questions asked via a computer network and of motivating the answering of such questions. While the above description contains many specifics, these should not be construed as limitations on the scope of the invention, but rather as an example of one preferred embodiment thereof. Many other variations are possible. For example, regulation of questions asked and evaluation of answers might be done without a point system by simply assigning a fixed, e.g. one point, value to each question. The process in FIG. 1 might be modified to permit only one answerer for a given question. Ranking of answerers might be done by assigning a grade-level or other non-numerical evaluation, instead of a number of answer points, based on the quality and number of answers given. The quality of answers might be evaluated by the promptness with which they are posted, as well as by their content. Questions might be assigned points based on their length rather than their complexity. Every answerer might be given the same evaluation in step 108 so that answer points are distributed uniformly among them. An asker might be permitted to reduce as well as increase the number N of question points at step 108.

Accordingly, the scope of the invention should be determined not by the embodiment illustrated, but by the appended claims and their legal equivalents.

We claim:

1. A method for regulating the asking and answering of questions via a computer network, comprising:
   providing a computer network for relaying and storing questions and answers;
   receiving questions posed by users seeking answers to the questions via the computer network;
   storing the questions in the computer network;
   organizing the questions in the computer network;
   regulating a number and complexity of questions posed via the computer network;
   receiving the answers via the computer network;
   storing the answers in the computer network;
   organizing the answers in the computer network;
   receiving a quality of answer value via the computer network;
   displaying the quality of answer value via the computer network; and
   storing the quality of answer value in the computer network.

2. The method in claim 1 wherein said step of receiving questions further comprises:
   receiving assigned question points for each of said questions; and
   storing the assigned question points for each of said questions in said computer network.

3. The method of claim 2 wherein said step of regulating further comprises rejecting ones of said questions in the event said assigned question points for the ones of said questions are greater than a number of available question points.

4. The method of claim 3 wherein said step of receiving said quality of answer value further comprises:
   accepting said answers;
   receiving answer values for said answers, having been accepted;
   storing the answer values in the computer network;
   awarding answer points to answerers as a function of at least one of said assigned question points and the answer values; and
   setting the quality of answer value equal to the answer points; and
   storing the quality of answer value in said computer network.

5. A method of receiving questions and publishing answers via a computer network comprising:
   receiving a question posed by a user seeking an answer to the question and a number of assigned question points through the computer network;
   storing the question in the computer network;
   displaying the question and the number of assigned question points through the computer network;
   receiving a proposed answer to the question through the computer network;
   storing the proposed answer in the computer network;
   displaying the proposed answer to the question through the computer network;
   accepting a proposed answer through the computer network;
   receiving an answer value for the proposed answer having been accepted;
   storing the answer value in the computer network;
   awarding a number of answer points as a function of at least one of the number of assigned question points and the answer value; and
   storing the number of answer points in the computer network.

6. The method of claim 5 further comprising displaying the proposed answer, having been accepted, through said computer network.

7. The method of claim 5 further comprising:
   said awarding step including awarding said number of answer points to an answerer;
   displaying a total number of answer points received by the answerer as a function of said number of answer points having been awarded to the answerer; and
   storing the total number of answer points in said computer network.

8. The method of claim 5 further comprising
   rejecting said question in the event a number of available question points is less than said number of assigned question points.

9. The method of claim 8 further comprising
   escrowing said number of assigned question points following said receiving of the question and the number of assigned question points; and
   deducting said number of assigned question points having been escrowed from said number of available question points.

10. The method of claim 9 further comprising deducting said number of assigned question points having been escrowed from a total number of question points following said accepting of said proposed answer, said available number of question points being equal to said total number of question points minus said number of assigned question points having been escrowed.

11. The method of claim 5, further comprising:

providing a number of available question points to one or more users in said computer network; and periodically increasing the number of available question points.

12. A method of receiving and publishing questions and answers via a computer network comprising:

receiving a question posed by a user seeking an answer to the question through the computer network;

storing the question in the computer network;

displaying the question through the computer network;

receiving a proposed answer to the question through the computer network;

storing the proposed answer in the computer network;

displaying the proposed answer to the question through the computer network; and accepting the proposed answer having been displayed through the computer network.

13. The method of claim 12 further comprising displaying the proposed answer, having been accepted through said computer network.

14. The method of claim 12 wherein said receiving the question step further comprises:

receiving a number of assigned question points through said computer network; and storing the number of assigned question points in said computer network.

15. The method of claim 14 wherein said displaying the question step further comprises displaying said number of assigned question points through said computer network.

16. The method of claim 15 further comprising rejecting said question in the event a number of available question points is less than said number of assigned question points.

17. The method of claim 16 further comprising:

escrowing said number of assigned question points following said receiving the number of assigned question points; and deducting said number of assigned question points having been escrowed from said number of available question points.

18. The method of claim 17 further comprising deducting said number of assigned question points having been escrowed from a total number of question points following said accepting a proposed answer, said available number of question points being equal to the total number of question points minus said number of assigned question points having been escrowed.

19. The method of claim 12 wherein said accepting said proposed answer further comprises:

receiving an answer value to said proposed answer having been accepted;

storing the subjective answer value in said computer network;

awarding a number of answer points as a function of at least the subjective answer value; and storing the number of answer points in said computer network.

20. The method of claim 19 further comprising displaying said number of answer points through said computer network.

21. The method of claim 20 further comprising:

said awarding step including awarding said number of answer points to an answerer;

displaying a total number of answer points received by an answerer as a function of said number of answer points having been awarded to the answerer; and storing the total number of answer points in said computer network.

22. A method of asking questions and accepting answers through a computer network comprising:

transmitting a question posed by a user seeking an answer to the question over the computer network;

receiving a proposed answer from the computer network;

accepting the proposed answer; and transmitting a subjective answer value, having accepted the proposed answer over the computer network.

23. The method of claim 22 wherein said step of transmitting a question further comprises transmitting a number of assigned question points over said computer network.

24. A method of answering a question posed over a computer network for point values comprising:

transmitting a proposed answer to a question posed by a user seeking an answer to the question over the computer network;

determining through the computer network, whether the proposed answer is accepted; and receiving a number of answer points as a function of an answer value, in the event the proposed answer is accepted.

25. The method of claim 24 wherein said step of receiving said number of answer points further includes receiving a number of answer points as a function of said answer value and a number of assigned question points, in the event the proposed answer is accepted.

26. A method for regulating the asking and answering of questions via a computer network, comprising:

providing a computer network for relaying and storing questions and answers;

receiving questions via the computer network;

receiving assigned question points for each of the questions;

storing questions in the computer network;

storing the assigned question points for each of the questions in the computer network organizing questions in the computer network;

regulating a number and complexity of questions posed via the computer network;

rejecting ones of the questions in the event the assigned question points for the ones of the questions are greater than a number of available question points;

receiving answers via the computer network;

storing answers in the computer network;

organizing answers in the computer network;

receiving a quality of answer value via the computer network;

displaying the quality of answer value via the computer network; and storing the quality of answer value in the computer network.

27. The method of claim 26 wherein said step of receiving said quality of answer value further comprises:

accepting said answers;

receiving answer values for said answers, having been accepted;

storing the answer values in the computer network;

awarding answer points to answerers as a function of at least one of said assigned question points and the answer values; and setting the quality of answer value equal to the answer points; and storing the quality of answer value in said computer network.

28. A method of receiving questions and publishing answers via a computer network comprising:

receiving a question and a number of assigned question points through the computer network;

rejecting the question in the event a number of available question points is less than the number of assigned question points;

storing the question in the computer network;

displaying the question and the number of assigned question points through the computer network;

receiving a proposed answer to the question through the computer network;

storing the proposed answer in the computer network;

displaying the proposed answer to the question through the computer network;

accepting a proposed answer through the computer network;

receiving an answer value for the proposed answer having been accepted;

storing the answer value in the computer network;

awarding a number of answer points as a function of at least one of the number of assigned question points and the answer value; and storing the number of answer points in the computer network.

29. The method of claim 28 further comprising escrowing said number of assigned question points following said receiving of the question and the number of assigned question points; and deducting said number of assigned question points having been escrowed from said number of available question points.

30. The method of claim 29 further comprising deducting said number of assigned question points having been escrowed from a total number of question points following said accepting of said proposed answer, said available number of question points being equal to said total number of question points minus said number of assigned question points having been escrowed.

31. A method of receiving questions and publishing answers via a computer network comprising:

providing a number of available question points to one or more users in said computer network;

receiving a question and a number of assigned question points through the computer network;

storing the question in the computer network;

displaying the question and the number of assigned question points through the computer network;

receiving a proposed answer to the question through the computer network;

storing the proposed answer in the computer network;

displaying the proposed answer to the question through the computer network;

accepting a proposed answer through the computer network;

receiving an answer value for the proposed answer having been accepted;

storing the answer value in the computer network;

awarding a number of answer points as a function of at least one of the number of assigned question points and the answer value; and storing the number of answer points in the computer network.

32. The method of claim 31 further comprising periodically increasing said number of available question points.

33. A method of receiving and publishing questions and answers via a computer network comprising:

receiving a question and a number of assigned question points through the computer network;

rejecting the question in the event a number of available question points is less than the number of assigned question points;

storing the question and the number of assigned question points in the computer network;

displaying the question through the computer network;

receiving a proposed answer to the question through the computer network;

storing the proposed answer in the computer network;

displaying the proposed answer to the question through the computer network; and accepting the proposed answer having been displayed through the computer network.

34. The method of claim 33 further comprising:

escrowing said number of assigned question points following said receiving the number of assigned question points; and deducting said number of assigned question points having been escrowed from said number of available question points.

35. The method of claim 34 further comprising deducting said number of assigned question points having been escrowed from a total number of question points following said accepting a proposed answer, said available number of question points being equal to the total number of question points minus said number of assigned question points having been escrowed.

* * * * *